July 24, 1956
C. J. SMITH ET AL
2,755,627
POWER STEERING DEVICE AND VALVE THEREFOR
Filed Aug. 14, 1953
3 Sheets-Sheet 1
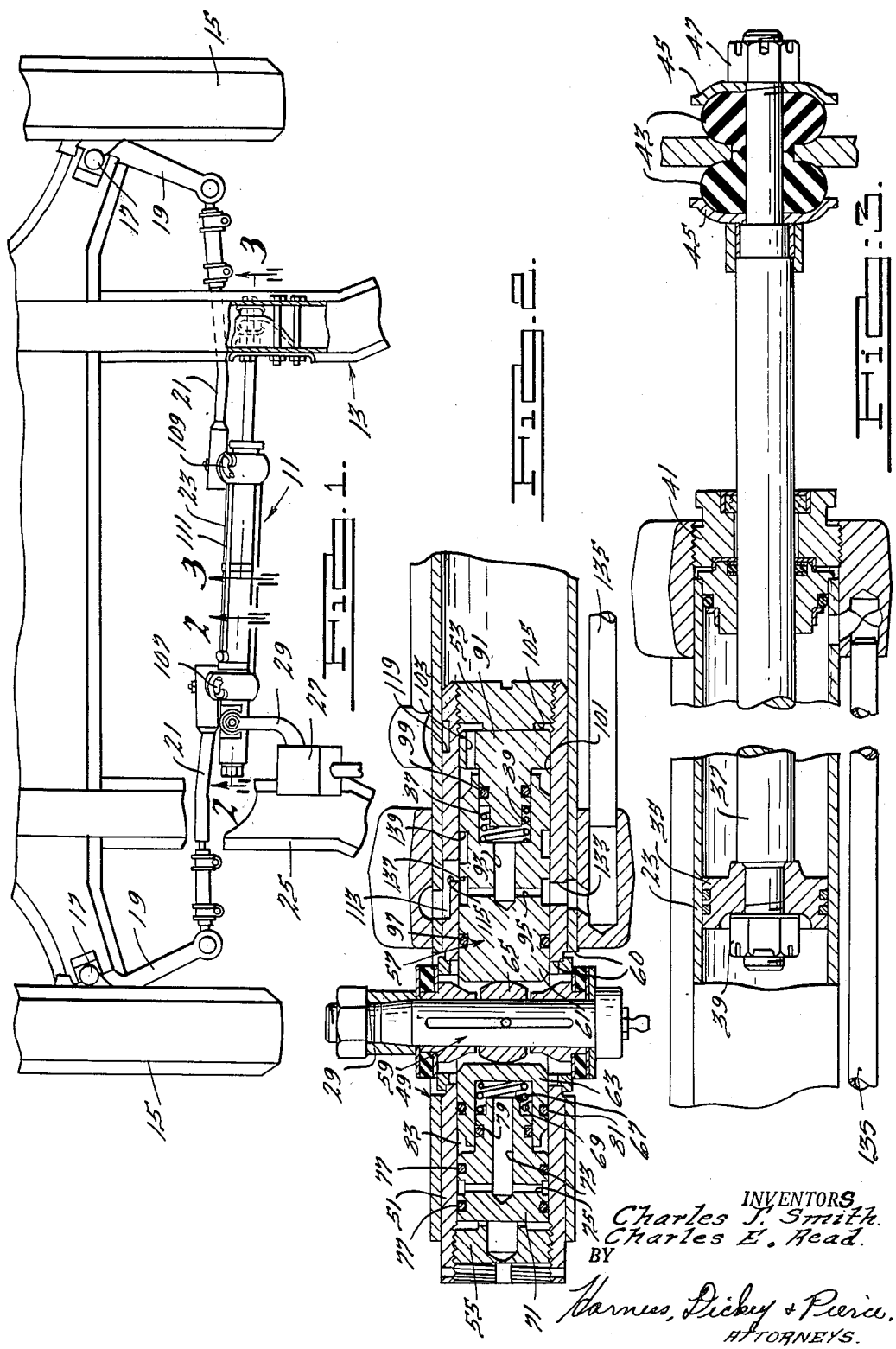
INVENTORS
Charles J. Smith.
Charles E. Read.
BY
Harness, Dickey & Pierce.
ATTORNEYS.

July 24, 1956   C. J. SMITH ET AL   2,755,627
POWER STEERING DEVICE AND VALVE THEREFOR
Filed Aug. 14, 1953   3 Sheets-Sheet 2

INVENTORS
Charles J. Smith
Charles E. Read
BY
Harness, Dickey & Pierce
ATTORNEYS

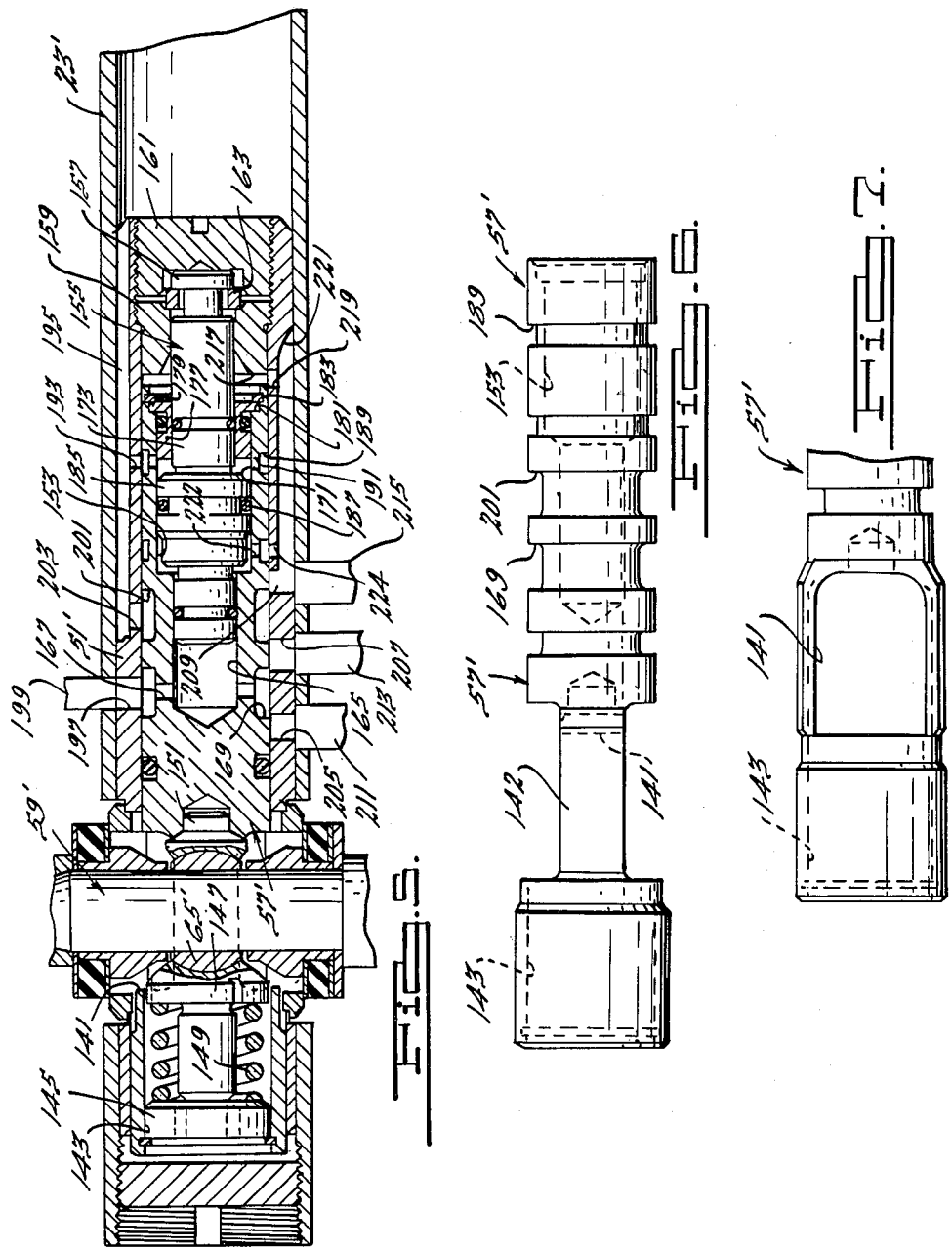

United States Patent Office 2,755,627
Patented July 24, 1956

2,755,627

POWER STEERING DEVICE AND VALVE THEREFOR

Charles J. Smith and Charles E. Read, Monroe, Mich., assignors to Monroe Auto Equipment Company, Monroe, Mich., a corporation of Michigan Application August 14, 1953, Serial No. 374,189

6 Claims. (Cl. 60—52)

This invention relates generally to power steering devices of the type illustrated in the copending application of Charles J. Smith, Serial No. 311,898, filed September 27, 1952, entitled Power Steering Device, now United States Patent No. 2,676,663, and more particularly to a novel control valve and associated fluid motor of the piston and cylinder type, for such devices.

The power steering device illustrated in the aforementioned Smith patent application is of the general type wherein the fluid motor is of the piston and cylinder type having a piston rod connected to the piston and projecting through one end of the cylinder for connection to a vehicle frame, while the cylinder is adapted to be connected with vehicle ground engaging wheel steering links. A fluid pump and reservoir unit is operatively connected with the vehicle engine and communicates with the fluid motor through a control valve, which is of the type having telescopically related elements, such as a spool valve element and cylindrical housing or sleeve. The vehicle steering gear pitman arm is connected with the spool valve element for actuating the same so as to control the flow of fluid to the cylinder on opposite sides of the piston. The spool valve element is illustrated in the Smith application as being normally retained or urged toward a neutral position by means of opposed coil springs and the spool valve can move relative to the sleeve only when the effort required for turning the steering wheel, to turn the ground engaging wheels, exceeds the force exerted by the spool centering springs. While this power steering device has proven to be satisfactory in most installations, there are certain inherent problems created by the use of springs alone to center the spool valve or maintain the same in its neutral position. For example, spring vibration or chatter can occur, which reacts unfavorably on the spool valve element and as the springs are compressed by movement of the spool valve element, the rate thereof builds up or increases in proportion to the amount of spring compression. Furthermore, when wear occurs between the valve spool and its actuator the valve can get out of adjustment, which might affect the opreation of the power steering device.

It is therefore an object of this invention to provide an improved control valve and fluid motor construction of the aforementioned type, in which the aforementioned problems are eliminated.

It is a further object of this invention to provide, in a unit of the aforementioned type, relatively light opposed springs, reacting against the spool valve and the valve housing, in combination with fluid under pressure delivered to opposed reaction chambers in the control valve from the cylinder on opposite sides of the piston, to thereby automatically center the valve spool in the valve housing and prevent the valve from getting out of adjustment, while at the same time eliminating spring vibrations and the use of springs of a substantial strength which will tend to build up in spring rate as the spool valve moves.

It is a still further object of this invention to provide a device of the aforementioned type, in which the spool valve can move relative to the control valve housing through the application of a relatively light torque on the part of the driver on the steering wheel, while at the same time insuring sufficient resilient force to urge or maintain the spool valve in its centered position and retain the spool valve in engagement with its actuation arm.

It is a still further object of this invention to provide a control valve and fluid motor construction of the aforementioned type in which the force required to actuate the control valve will be proportionate to the force required to turn the vehicle ground engaging wheels.

It is a still further object of this invention to provide a construction of the aforementioned type, which is relatively simple and inexpensive to manufacture, efficient in operation, and durable in construction.

These and other objects of this invention will become apparent from the following detailed description, taken in conjunction with the accompanying drawings, in which:

Figure 1 is a fragmentary top elevational view of the front portion of a vehicle with the steering device of this invention connected therewith;

Fig. 2 is an enlarged sectional view of the structure illustrated in Fig. 1, taken along the line 2—2 thereof;

Fig. 3 is an enlarged sectional view of the structure illustrated in Fig. 1, taken along the line 3—3 thereof;

Fig. 5 is a sectional view similar to Fig. 2, of a further embodiment of the invention;

Fig. 6 is an elevational view of the valve spool illustrated in Fig. 5;

Fig. 7 is a fragmentary plan view of the spool illustrated in Fig. 6; and

Figure 4:
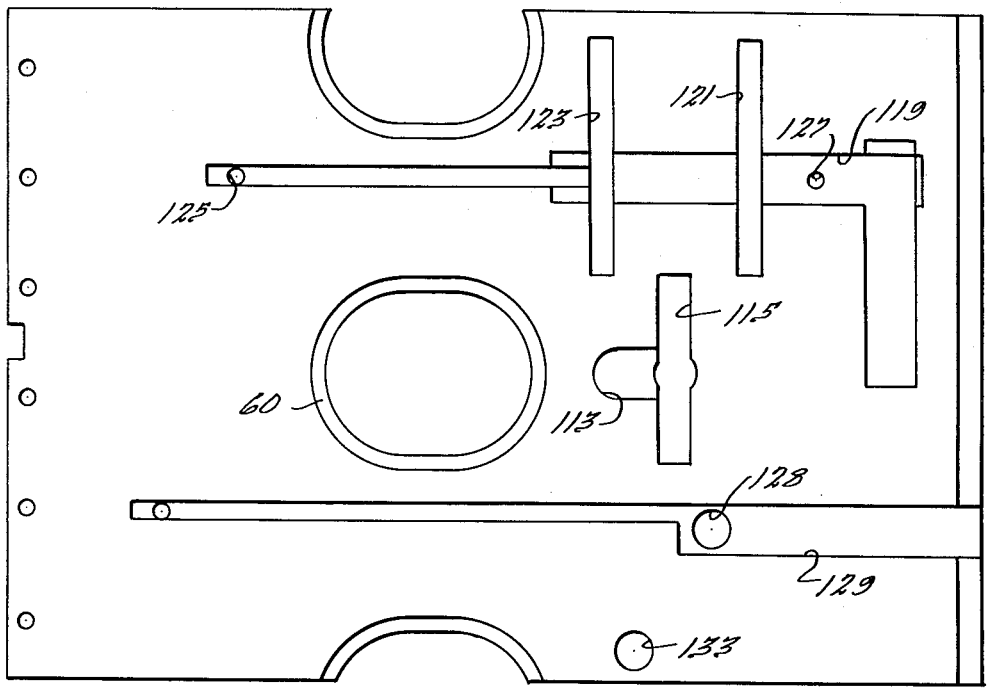
Fig. 4 is an elevational view of the control valve sleeve or housing, in an unwrapped or flat position.
Figure 8:
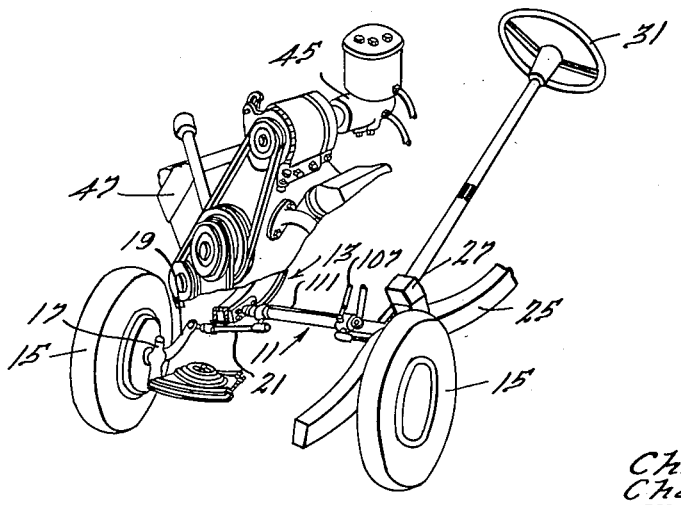
Fig. 8 is a schematic view showing the power steering device on a vehicle, and connected with a fluid pump and reservoir.

Referring now to the drawings and more particularly to Fig. 1, it will be seen that a power steering device, generally indicated at 11, is mounted on a vehicle 13, in substantially the same manner as illustrated in the aforementioned Smith patent application. The vehicle includes ground engaging wheels 15, each supported in a conventional manner on a steering knuckle assembly 17, which includes a steering knuckle arm 19, adjacent each ground engaging wheel 15, for turning the same about the steering knuckle assembly, and steering links 21 connected with the steering knuckle arms 19 in a conventional manner. The inner ends of the steering links 21 are connected to a power steering device cylinder 23 through a ball and socket type connection so that lateral movement of the transversely extending cylinder 23 will cause turning movement of the ground engaging wheels 15, in accordance with the direction of movement of the cylinder. Supported on the vehicle frame 25 is a steering gear assembly 27 which includes a conventional pitman or steering arm 29, which is actuated when the vehicle steering wheel 31 is turned.

A piston 35 is disposed within the cylinder 23 adjacent one end thereof, and a piston rod 37 is connected to the piston by means of a nut 39, while its opposite end projects through the cylinder and a rod guide and seal assembly 41 in one end of the cylinder. The projecting end of the piston rod 37 is anchored to a longitudinal vehicle frame member by suitable means such as rubber washerlike members 43, metallic confining members 45, and a nut 47 threaded onto the reduced end of the piston rod. The cylinder 23, piston 35, and piston rod 37 thus constitute a fluid motor connected to the steered part of the vehicle for actuating the same.

A fluid pump and reservoir unit 45 is operatively connected with a vehicle engine 47 for supplying fluid under pressure to the fluid motor. A control valve 49 is interposed in the lines of communication between the fluid pump and the fluid motor. While the control valve may be located in various places relative to the fluid motor 23, it is illustrated as being disposed in the opposite end of the cylinder 23 from the piston 35. The control valve 49 includes a cylindrical housing or sleeve member 51, which is press fitted into the cylinder 23 and has its opposite ends closed by closure members 53 and 55. A telescopically related spool valve element 57 is slidably disposed in the housing or sleeve 51. The spool valve is actuated by means of an actuator 59, which extends through suitable openings 60 in the cylinder 23 and housing 51 into engagement with the spool valve element 57. The actuator 59 is connected with the pitman arm 29, in any suitable manner so that movement of the pitman arm will be translated to the control valve 49 through the actuator 59. While the spool valve element 57 may be made in one or more sections or pieces, it is illustrated as being made in two parts, one part 61 being disposed on one side of the actuator, and the other part 63 being disposed on the opposite side of the actuator. The spool valve element part 63 may be termed a follower and engages a spherical ball-like portion 65 of the actuator 59. The follower part 63 is urged into engagement with the actuator ball element 65 by means of a relatively light coil spring 67 which is disposed in a reaction chamber 69 provided between the housing and element 57. The spring 67 is disposed in a recess within the follower and abuts a reaction piston or stationary member 71 pressed into the sleeve 51 and abutting closure member 55. The member 71 has a longitudinally extending aperture 73 therein, which opens into the reaction chamber 69 and communicates adjacent its opposite end with a laterally extending opening or passageway 75. Suitable O-rings 77 extend around the periphery of the member 71 on opposite sides of the passageway 75 to prevent the leakage of hydraulic fluid therepast. The passage 75 is adapted to be connected through suitable conduits, to be hereinafter described, with the cylinder 23 on one side of the piston 35, as will be hereinafter described. Additional O-rings 79 and 81 are provided between the member 71 and the follower 63, and the follower 63 and the sleeve 51, respectively, to prevent leakage of fluid therepast. An annular passage 83 is provided between the follower 63 and the member 71 to collect any fluid which might possibly leak past the O-rings, and the passage 83 is adapted to be connected with the fluid reservoir through suitable conduits, as will be hereinafter described.

A relatively light coil spring 87 is disposed in an opposed reaction chamber 89 adjacent the opposite end of the spool valve 57. The reaction chamber 89 is formed by a recess in one end of the valve spool part 61 and the spring 87 is disposed between the bottom of the spool recess and a stationary reaction piston or member 91 which is fitted into the sleeve 51 and abuts the closure member 53. The springs 67 and 87 are of relatively light weight and are provided primarily to insure continued engagement of the spool valve parts 61 and 63 with the actuator ball member 65 at all times. In other words, the springs resiliently maintain the spool valve parts against the actuator and prevent the parts from moving away from the actuator even if there is no fluid under pressure in the reaction chambers. A longitudinally extending passageway 93 communicates with the reaction chamber 89 and is connected adjacent its inner end with a transversely or laterally extending passageway 95, which in turn is adapted to be connected to the interior of the cylinder 23 on the right hand side thereof, as viewed in Fig. 3, or the piston rod side of the piston 35, by suitable conduits, as will be hereinafter described. Suitable O-rings 97 and 99 are provided between the spool valve part 61 and the sleeve 51, and the spool valve element part 61 and the reaction piston 91, respectively, prevent the leakage of fluid therepast. An annular passage 101 is provided between the end of the spool valve element 61 and the reaction piston 91 for collecting any fluid which might leak past the spool valve. The annular passage 101 is connected to the reservoir through suitable conduits, to be hereinafter described. The reaction piston 91 has a passage 103 therethrough, which communicates with an annular space or groove 105 in the adjacent wall of the closure member 53 so that any fluid which may leak past the closure member 53 from the cylinder can likewise be drained to the reservoir.

The control valve 49 is interposed in a conduit system between the fluid pump and reservoir 45 and the piston and cylinder fluid motor to direct the flow of fluid to and from the cylinder 23 on opposite sides of the piston 35. A pressure conduit 107 connects the fluid pump 45 with the control valve 49, while a sump conduit 109 is connected with the fluid pump reservoir and with the control valve 49. In the illustrated embodiment of the invention, because of particular vehicle installation problems, the conduit 109 is not connected directly to the control valve but is connected therewith through a conduit or tube member 111, which extends parallel to the cylinder 23 from the piston rod end thereof to the control valve end thereof.

As can be best seen in Fig. 4, the sleeve 51 is provided with a groove 113 into which the pressure conduit 107 is connected. The groove 113 communicates with a circumferentially extending slot 115, for directing the hydraulic fluid from the pump to the interior of the control valve. The sump conduit 109 communicates with the control valve through the conduit 111, which connects with the interior of the control valve through an aperture in the cylinder 23. The cylinder aperture communicates with a groove 119 in sleeve 51 which in turn communicates with a pair of spaced circumferentially extending sleeve slots 121 and 123, which are longitudinally spaced on opposite sides of the pressure conduit groove 115. The sump groove 119 extends beyond the slot 123 and communicates with an aperture 125 adjacent the left hand end thereof, as viewed in Fig. 4, which aperture communicates with the annular passageway 83 between the spool valve follower part 63 and the reaction piston 71, so that any fluid in said passageway can flow to the reservoir therethrough. The sleeve 51 likewise has an aperture 127 adjacent the opposite end of groove 119, which communicates with the annular passageway 101 between the spool valve part 61 and the reaction piston 91, to let fluid collected therein flow to the reservoir, as previously described. The sleeve is, in addition, provided with an aperture 128 therein, which communicates the interior of the sleeve with a groove 129 extending along the outer surface thereof, into communication with the left hand end of the fluid motor or piston and cylinder unit, as viewed in Figs. 2, 3 and 4. The groove 127 extends beyond the opposite side of aperture 129 and the sleeve has an aperture 131 therein communicating with the groove and with the transversely extending passageway 75 in the reaction piston 71 so as to connect the reaction chamber 69 with the fluid motor cylinder on the left hand side of the piston 35. The sleeve is also provided with an aperture 133 therein, which communicates with the interior of the valve and with one end of a suitable outside conduit 135, which has its opposite end connected to the fluid motor on the right hand side of the piston 35, as can be best seen in Figs. 2 and 3.

The valve spool portion 61 is provided with a first annular groove 137 and a second annular groove 139 spaced from the groove 137. The grooves are so located that when the spool is in its neutral position both grooves will communicate with the sleeve pressure slot 115 and the sump slots 121 and 123, as well as with the apertures 128 and 133 which lead to the opposite sides of the cylinder. That is, the spool grooves 137 and 139 will be slightly open to the sleeve pressure slot 115, so that fluid under a relatively low pressure will circulate. The spool groove 137 will be open more to the pressure slot 115 than the groove 139, so that a greater fluid pressure will be obtained on the right hand side of the fluid motor cylinder than on the opposite side, in view of the piston rod displacement. This maintains a balanced condition, as previously described. The spool grooves 137 and 139 are likewise in communication with the sleeve sump grooves 123 and 121 and the area of communication with the sump grooves will be greater than the area of communication with the pressure slot 115, so that practically no pressure will exist in either side of the fluid motor when the spool is in its neutral position relative to the sleeve. The spool grooves 137 and 139 control the flow of fluid to and from either side of the cylinder 23 with respect to the pressure and sump conduits. The valve spool passageway 95 communicates with spool groove 137 so that the fluid pressure in the right hand end of cylinder 23 is transmitted to reaction chamber 89, and the reaction chamber 69 is connected to the opposite side of cylinder 23 so that the fluid pressures therein remain the same.

It will thus be seen that the reaction chamber 89 communicates with the cylinder on the piston rod side of the piston 35 while the reaction chamber 69 communicates with the cylinder on the opposite side of the piston. Because of the presence of the piston rod 37, the area of the piston face against which fluid in the right hand side of the cylinder reacts is smaller than the area of the piston face on the opposite side of the piston. Thus, in order to maintain a balanced condition in the fluid motor, the pressure of the fluid in the piston rod side of the cylinder must be greater than the pressure of the fluid in the opposite side of the cylinder because of the difference of the areas on which the fluid pressure is reacting. Likewise, the area of the spool valve 57 exposed to the reaction chamber 89 must be smaller than the area of the valve spool exposed to the reaction chamber 69 because of the difference in pressures and because the reaction chambers are connected with the opposite sides of the fluid motor cylinder. The areas of the valve spool exposed to the reaction chamber 89 should therefore be less than the area of the valve spool exposed to the reaction chamber 69 substantially in the same proportion that the area of the piston 35 on the piston rod side thereof is smaller than the area of the piston exposed to the fluid pressure on the opposite side thereof.

When it is desired to turn the ground engaging wheels 15, to steer the vehicle to the left, the vehicle operator turns the steering wheel 31, which movement causes the pitman arm 29 and the actuator 59 to move to the right. The entire unit, including the control valve and fluid motor, will then move to the right until the force required to turn the ground engaging wheels is greater than the force of the fluid and spring 87 maintaining the spool in its neutral or centered position. When this force is exceeded, the spool will move relative to the sleeve 51, which movement will move the spool groove 137 into more open communication with the sleeve pressure slot 115 and the spool groove 139 into more open communication with the sleeve sump slot 121, so as to increase the pressure of the fluid flowing to the right hand side of the cylinder piston 35. Simultaneously the pressure in the reaction chamber 89 will be increased and the pressure on the life hand side of the piston 35 and in the reaction chamber 69 will be decreased. There is, therefore, an increasing fluid pressure tending to return the spool to its neutral position and when the force required to turn the ground engaging wheels decreases, the fluid pressure in the reaction chamber 89 will move the spool and sleeve relative to each other back to the neutral position to thereby relieve the pressure on the right hand side of the piston 35 in the cylinder.

Conversely, when it is desired to turn the vehicle to the right, the steering wheel is turned and the entire fluid motor and control valve unit moves to the left with the pitman arm until the force required to turn the ground engaging wheels exceeds the centering pressure exerted by the fluid and spring in reaction chamber 69, at which time the spool valve will shift to the left to bring the spool groove 139 into more open communication with the sleeve pressure slot 115 and the spool groove 137 into more open communication with the sleeve sump groove 123, thereby increasing the fluid pressure on the left hand side of the piston 35 and decreasing the same on the right hand side.

The springs 67 and 87 are relatively light springs which act primarily to maintain the valve spool portions 61 and 63 in engagement with the actuator ball 65. The springs are not heavy enough to, in and of themselves, resist spool displacement with a sufficient force to give the steering characteristics desired, and the fluid pressure in the reaction chambers 69 and 89 is relied upon for this purpose and for the purpose of returning the valve to neutral after its actuation. It will be appreciated that the pressure of fluid in the reaction chambers is substantially the same as the pressure of the fluid in the fluid motor cylinder on opposite sides of the piston 35 and increases and decreases with the fluid pressures in the fluid motor. Furthermore, the fluid in the reaction chamber will dampen any tendency in the springs 67 and 87 to vibrate, and as the springs are relatively light their build-up in rate as they are compressed will have a negligible effect on the steering effort, as the fluid pressure provides the primary effect. The area of the valve spool exposed to the reaction chambers 69 and 89 can, of course, be varied and as the area is decreased the force which must be exerted by the vehicle operator to turn the ground engaging wheels is decreased. That is, some automotive manufacturers prefer a steering system wherein two or three pounds of steering wheel torque is required before the valve spool will shift to bring the hydraulic steering into effect, while others like either more or less torque. The requirements of the automotive manufacturers can be met by varying the areas of the valve spool exposed to the reaction chambers. In view of the fact that the valve spool only shifts up to about one thirty-second of an inch ($\frac{1}{32}''$) its movement and position is accurately controlled by the fluid in the reaction chambers, the pressures of which remain substantially identical with the pressure in the fluid motor, and "road feel" is maintained in accordance with the automotive manufacturer's desire. Thus, the force required to turn the ground engaging wheels will control the pressure in the fluid motor cylinder on opposite sides of the piston, as well as the pressure in the reaction chambers, to give the desired steering feel and operation under all conditions. In addition, the fluid pressure in the reaction chambers automatically centers or maintains the valve spool in its neutral position in the sleeve. That is, even if wear occurs in the control valve so that the spool would tend to be out of adjustment, the fluid pressure in the reaction chambers will automatically position the spool in a neutral position, because the reaction chambers are interconnected with the opposite sides of the fluid motor. Thus, the unit can not get out of adjustment, as it might if only springs were employed as the means to center the spool.

In the embodiment of the invention illustrated in Figs. 5, 6, and 7, primed numbers are used to designate parts substantially similar to parts described in connection with the previous embodiment. The device shown in this embodiment is substantially similar to that described in the previous embodiment except that a one-piece control valve spool 57' is mounted in one end of the cylinder 23', as previously described. The valve spool 57' is slidably disposed in the sleeve 51' and has an aperture 141 in a reduced intermediate portion 142 thereof, through which the actuator 59' extends. The left hand end of the valve spool is of an enlarged tubular construction to provide a recess 143, closed at its outer end by suitable closure means 145. Slidably supported in the recess 143 is a plunger or shoe 147, which is yieldably urged into engagement with the actuator ball portion 65' by a coil spring 149, which abuts the closure 145. A plunger or shoe 151 is supported in the valve spool 57' on the opposite side of the aperture 141, as viewed in Fig. 5, and abuts the opposite side of the actuator ball member 65'.

The right hand end of the valve spool 57' is recessed at 153 to receive a reaction piston 155. The reaction piston 155 is anchored to the sleeve 51' so as to be a stationary member. This is accomplished by having an enlarged end flange 157 on the reaction piston, which is locked against movement between plugs or closure members 159 and 161, which are threadably connected to the sleeve 51'. A locking ring 163 is disposed between the enlarged flanged end 157 and the closure member 159, while the opposite side of the flanged end 157 abuts the closure member 161. A reaction chamber 165 is provided between the bottom of the valve spool recess 153 and the inner end of the reaction piston 155. The spool is provided with a transversely extending passageway 167, which communicates with the reaction chamber 165 and with an annular groove 169 in the outer periphery of the spool. A second reaction chamber 171 is provided adjacent the opposite end of the spool. This reaction chamber is formed by having a reduced portion 173 of the reaction piston 155 extending through the central bore of a bushing 177, which is pressed into the valve spool recess 153. The bushing 177 has an annular shoulder 179 adjacent one end thereof, which abuts against an annular shoulder 181 in the wall of the recess 153 to prevent movement of the bushing to the left, while a lock ring 183 prevents movement of the bushing to the right. The reaction chamber is therefore provided between the bushing 177 and the adjacent enlarged spool-like portion 185 of the reaction piston 155. Suitable O-rings 187 are provided between the reaction piston and the bushing, the reaction piston and the spool, and the bushing and spool, to prevent leakage of fluid therepast.

The valve spool 57' is provided with an annular groove 189 adjacent the reaction chamber 171 and with a passageway 191 which communicates with the groove. The spool groove 189 communicates with an opening 193 in sleeve 51' which in turn has a groove or slot 195 therein which communicates with the cylinder 23' on one side of the piston. The reaction chamber 165 communicates on the opposite side of the cylinder through the passageway 167, groove 169 and an aperture 197 in sleeve 51' into which a conduit 199 is connected, the opposite end of which communicates with the piston rod side of the cylinder. Thus, the reaction chambers 165 and 171 communicate with the fluid motor cylinder on opposite sides of the piston in substantially the same manner as previously described.

The valve spool 57' is provided with an additional groove 201 in the outer periphery thereof, between the grooves 191 and 169, which groove communicates with an aperture 203 in the sleeve, which in turn communicates with the slot 195 leading to the left hand end of the cylinder. The grooves 201 and 169 also communicate with apertures 205, 207 and 209 in the sleeve. Conduits 211, 213, and 215 are connected with the sleeve apertures 205, 207, and 209 respectively, and lead to the fluid pump and reservoir unit with the conduits 211 and 215 being sump conduits and conduit 213 being a pressure conduit.

The valve operates in substantially the same manner as that previously described, in that fluid under pressure from the pump flows through conduit 213 into the interior of the control valve and thence to opposite sides of the cylinder, while conduits 211 and 215 connect the opposite sides of the cylinder to the reservoir to control the flow of fluid to and from opposite sides of the cylinder, all substantially as previously described. It should also be noted that an annular passageway or chamber 217 is provided between the closure member 159 and the back of bushing 177, so that any fluid which may leak between the reaction piston and the valve spool or between the spool and the sleeve will accumulate therein and can return to the reservoir through a sleeve opening 219 and groove 221, which communicates with the sump conduit 215. Likewise a passageway 222 and groove 223 in the spool, adjacent the inner end of the reaction piston, communicate with a passageway 224 in sleeve 51' to drain any leaked fluid from the spool recess 153.

As the function of the devices shown in both embodiments of the invention is substantially identical, it is thought that a further description of the device illustrated in Figs. 5 through 7 is not necessary. The primary difference between the two embodiments resides in the fact that in the second embodiment (Figs. 5 through 7) a one-piece valve spool is employed with a one-piece reaction piston, whereas in the first embodiment a two-piece valve spool, as well as two reaction pistons, are employed. The device illustrated in the second embodiment will operate to perform the same function and result as has been previously described, and to provide a simple, efficient power steering device in which the amount of "road feel" may be varied by changing the areas of the valve spool exposed to the reaction chambers. Likewise, the automatic valve centering feature, as well as the other features previously described are maintained in the construction shown in Figs. 5 through 7.

What is claimed is:

1. In a power steering device for vehicles having a steered part, a fluid motor including a piston, a cylinder and a piston rod connected with said piston and extending through one end of said cylinder, means for connecting said motor to the vehicle steered part, a fluid pump, means of communication between said pump and said motor cylinder on opposite sides of said piston, a control valve interposed in said means of communication, including telescopically related elements operable upon relative movement from a neutral position to thereby control the flow of fluid to said motor cylinder on opposite sides of said piston, means to actuate said valve, opposed reaction chambers within said valve between said telescopically related elements, the area of one of said elements exposed to one of said reaction chambers being less than the area of said one element exposed to the other of said reaction chambers, and means to direct and transmit fluid under pressure from said motor cylinder on opposite sides of said piston to said reaction chambers to resist telescopic displacement of said elements from a neutral position, said one reaction chamber being connected with said cylinder on the piston rod side thereof, while said other reaction chamber is connected with the cylinder on the opposed side of said piston.

2. In a vehicle power steering device, a cylinder member, a piston member within said cylinder member, a piston rod connected to said piston member and projecting through one end of said cylinder member, said members being movable relative to each other and one of said members being anchorable against movement and the other being connectible to the steered part of a vehicle, a control valve including housing means, spool valve means slidably supported in said housing means, means for actuating said control valve and effecting relative movement between said spool valve means and said housing means, first conduit means connecting said control valve with said cylinder member on one side of said piston member, second conduit means connecting said control valve with said cylinder member on the side of said cylinder through which said piston rod extends, pressure and sump conduit means for connecting said control valve with a fluid pump and reservoir, said spool valve means having passageways adapted to connect said pressure and sump conduit means with the cylinder member conduit means, means defining opposed reaction chambers between said housing means and said spool valve means, passageway means connecting said first cylinder member conduit means with one of said reaction chambers, passageway means connecting said second cylinder member conduit means with the other of said reaction chambers, said spool valve means having a smaller area exposed to said other reaction chamber than the area of said spool valve means exposed to said one reaction chamber in substantially the same proportion as the area of said piston member exposed to said fluid on the piston rod side of said cylinder member is to the piston member area exposed to fluid on the other side of said cylinder member.

3. In a power steering device for vehicles having a steered part, a fluid motor including a piston, a cylinder, and a piston rod connected to said piston and extending through one end of said cylinder, means for connecting said motor to a vehicle steered part, a fluid pump, means of communication between said pump and said motor cylinder on opposite sides of said piston, a control valve interposed in said means of communication and including telescopically related elements operable upon relative movement from a neutral position to control the flow of fluid from the pump to said motor cylinder on opposite sides of said piston, opposed reaction chambers in said control valve communicating with said telescopically related elements, the area of one of said elements exposed to one of said reaction chambers being smaller than the area of said one element exposed to the other reaction chamber, conduit means communicating said cylinder motor on the piston rod side of said piston with said one of said reaction chambers, conduit means communicating said cylinder on the opposite side of said piston with the other of said reaction chambers, and opposed spring means reacting against said telescopically related elements to coact with the fluid under pressure to resist telescopic displacement of said elements from a neutral position.

4. A control valve for use in a vehicle power steering device, including a cylindrical housing, valve spool means supported in said cylindrical housing for movement relative thereto, an actuator extending into said housing and engaging said spool means for actuating the same, said spool means having one part thereof disposed on one side of said actuator and another part thereof disposed on the opposite side of said actuator, stationary abutment means adjacent opposite ends of said spool means, opposed spring means engaging said spool means parts and said abutment means for retaining said spool means parts in engagement with said actuator, said spool means and said abutment means defining opposed reaction chamber adjacent opposite ends of said spool means, said housing having apertures therein adapted to communicate said control valve with a fluid pump and reservoir and with opposite sides of a piston and cylinder type fluid motor, passageway means in said control valve communicating said opposed reaction chambers with the housing apertures connectible to opposite sides of the fluid motor, the area of said spool means exposed to one of said reaction chambers being less than the area of said spool means exposed to the other of said reaction chambers.

5. A control valve for a vehicle power steering device, including a tubular housing, a cylindrical valve spool disposed in said tubular housing for movement relative thereto, an actuator extending into said housing and engaging one end of said valve spool, a follower member movably disposed in said tubular housing and abutting the opposite side of said actuator in an opposed relationship to said valve spool, said valve spool and said follower being recessed to provide opposed recesses in said control valve, abutment means connected with said tubular housing and extending into said opposed spool and follower recesses to cooperate therewith to define opposed reaction chambers, spring elements disposed in each of said reaction chambers between said abutment members and said spool and follower, said tubular housing having apertures therein connectible to a fluid pump and reservoir and to opposite sides of a piston and cylinder unit, passageway means in said spool selectively connectible with said apertures for directing the flow of fluid to and from said control valve, passageway means in said control valve communicating said opposed reaction chambers with the housing apertures connectible to the opposite sides of the piston and cylinder unit, the area of said spool and said follower exposed to said reaction chambers being different from each other.

6. A control valve for a power steering device, including a tubular housing, a one-piece valve spool disposed in said tubular housing for movement relative thereto, said valve spool and housing having generally aligned apertures therein, an actuator extending through said apertures into engagement with said valve spool, a movable plunger within said valve spool engaging said actuator, resilient means disposed between said plunger and valve spool urging said plunger into engagement with said actuator, said valve spool having a recess therein extending inwardly from one end thereof, a reaction piston disposed within said recess and being connected with said tubular housing, said reaction piston and valve spool defining therebetween opposed reaction chambers, conduit means connected with said tubular housing for connecting the interior thereof with a fluid pump and reservoir and with opposite sides of a piston and cylinder unit, passageway means in said valve spool communicating each of said reaction chambers with one of the conduit means which is connectible with the piston and cylinder unit so that said reaction chambers are adapted to communicate with the opposite sides of the piston and cylinder unit, the area of said valve spool exposed to one of said reaction chambers being less than the area of said valve spool exposed to the other reaction chamber.

References Cited in the file of this patent

UNITED STATES PATENTS

| | | |
|---|---|---|
| 2,440,948 | Hawkins et al. | May 4, 1948 |
| 2,603,065 | Sarto | July 15, 1952 |
| 2,608,263 | Garrison | Aug. 26, 1952 |
| 2,627,847 | Clark | Feb. 10, 1953 |
| 2,650,669 | Hammond | Sept. 1, 1953 |